3,440,133
COATED FABRICS HAVING HIGH STRETCH RATIOS

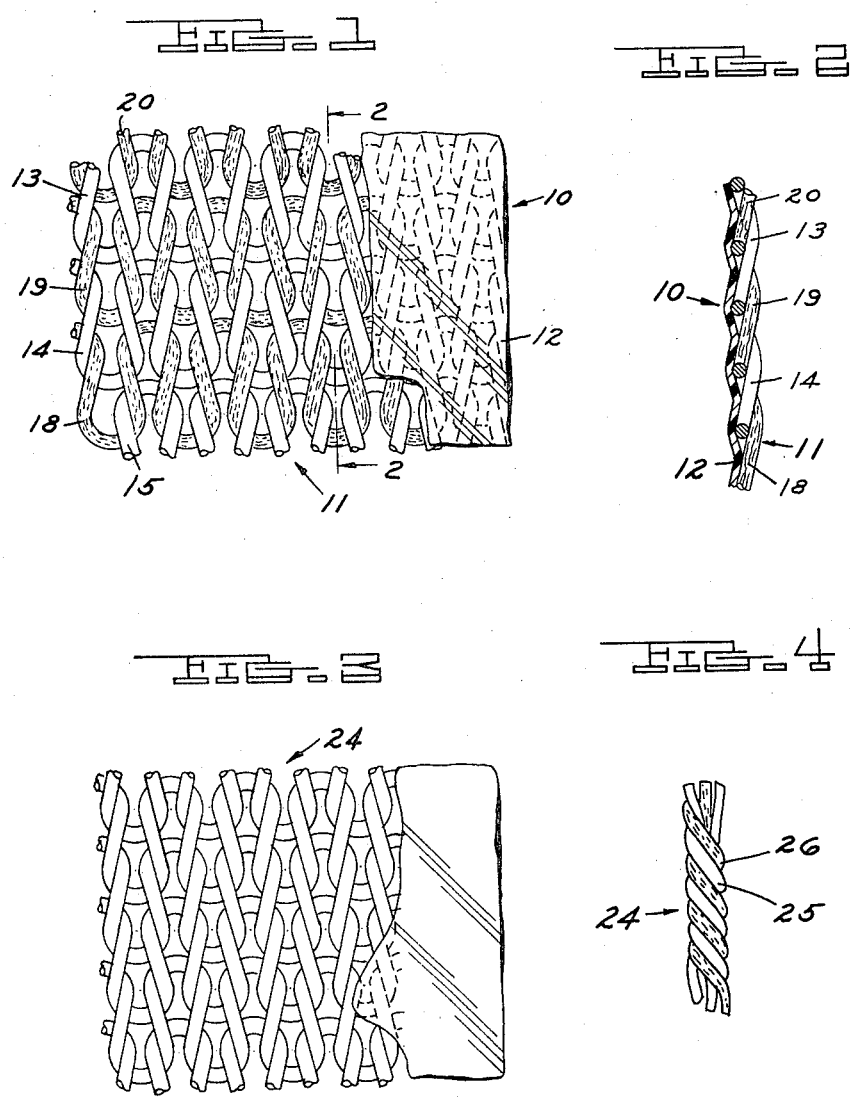

Peter P. A. Burnett, Mount Clemens, Mich., assignor to Ford Motor Company, Dearborn, Mich., a corporation of Delaware
Continuation-in-part of application Ser. No. 248,931, Jan. 2, 1963. This application Mar. 4, 1966, Ser. No. 540,784
Int. Cl. D03d 11/00
U.S. Cl. 161—89                8 Claims This is a continuation-in-part of application Ser. No. 248,931, filed Jan. 2, 1963 now abandoned.

This invention provides a coated, knitted fabric that has a relatively high ratio of percentage stretch in its wales direction to its courses direction. The fabric is particularly useful as a covering material in the upholstery industry.

Coated fabrics intended for use in the upholstery industry require a relatively high tear strength, good tensile strength, good adhesion of the coating to the substrate, good abrasion resistance, and good percentage stretch in at least one direction. Coated fabrics comprising a polymeric material adhered to a woven substrate satisfy these requirements and have been widely used for covering relatively flat surfaces such as door and side panels of automobiles. Minor surface contours can be covered with these coated woven substrates by bias cutting the fabric or by aligning the surface contour with the fabric dimension having the highest percent of stretch. However, the sharper contours of automotive seats along with the resiliency necessary in coverings for automotive seats require good percentage stretch in both surface directions of the covering fabric.

Knitted materials are known to have a better balance of percentage stretch in both surface directions than woven materials, and coated fabrics comprising a polymeric coating on a knitted substrate have been used widely for upholstering bench-type automotive seats. Automotive bucket seats present much sharper contours than the bench-type seats, and the widespread use of bucket seats intensified the search for coated fabrics having a percentage stretch ratio higher than the ordinary coated knitted fabrics.

The ordinary coated knitted fabrics useful on bench-type seats have ratios of percentage stretch in the wales direction to the courses direction usually less than 0.3 and, in some cases, up to about 0.35. Coated, knitted fabrics with substrates made of synthetic fiber yarns have been produced with higher percentage stretch ratios, but these fabrics require the use of adhesives between the coating and the substrate to maintain adhesion under the flexing and stretching encountered by automotive seat covering materials. The use of these adhesives increases the material and manufacturing costs to such an extent that coated synthetic substrates have not gained wide utility in the upholstery industry.

The coated fabric provided by this invention attains adequate adhesion between the coating and the substrate without the use of an adhesive and also has a ratio of percentage stretch in its wales direction to its courses direction of well over 0.36. This coated fabric consists essentially of a flexible polymeric coating adhered to at least one surface of a knitted substrate that comprises a blend of synthetic fiber yarn and natural fiber yarn. Automotive bucket seats utilize the good percentage stretch properties provided by the coated fabrics of this invention to greatest advantage. The fabrics are also useful on bench seats, as automobile headliners and side panels, and for upholstering household furnishings. Other advantages and applications of the coated fabrics of this invention are presented in the detailed description of the fabrics shown in the drawing in which:

FIGURE 1 is an enlarged view of a coated fabric of this invention with part of the coating broken away to show the knitted substrate comprising alternating courses of synthetic fiber yarn and natural fiber yarn;

FIGURE 2 is a side view of the coated fabric shown in FIGURE 1;

FIGURE 3 is an enlarged view of a coated fabric of this invention with part of the coating broken away to show a knitted substrate having each course made of the same yarn with the yarn itself comprising both natural fiber strands and synthetic fiber strands; and FIGURE 4 is a greatly enlarged view of the yarn used in the substrate of the coated fabric shown in FIGURE 3.

Referring to FIGURE 1 the coated fabric 10 comprises a substrate 11 and a coating 12 that adheres to one surface of substrate 11. Substrate 11 is knitted with courses of synthetic fiber yarn 13, 14 and 15 alternating with courses of natural fiber yarn 18, 19 and 20. Synthetic fiber yarns 13, 14 and 15 can be made from a wide variety of synthetic polymers such as regenerated cellulose, cellulose acetate, polyacrylonitriles, polyvinyl chloride, polyesters, polyamides (nylons), polyethylene, and polypropylene. Copolymers and interpolymers of these and other synthetic materials also can be used to make the synthetic fiber yarn. Synthetic yarns having a tenacity of at least three grams per denier are preferred in the substrates used in this invention because coated fabrics having a higher percentage stretch ratio result. Synthetic yarns having tenacities in the preferred range include yarns made from most of the commercially available polyamides which have tenacities of about seven grams per denier.

Natural fiber yarns 18, 19 and 20 can be made of materials such as cotton, linen, jute, etc. Both the natural and the synthetic yarns useful in this invention can be spun from fibers of various length including staple fibers. Substrates comprising from 25 to 75 percent by weight synthetic fiber yarn produce coated fabrics of this invention having the best balance of adhesion and percentage stretch ratio. Coated fabrics of this invention having good adhesion and percentage stretch ratios have been made with substrates having from 10 to 25 and 75 to 90 percent percent by weight of synthetic fiber yarn. Circular knitted substrates produce coated fabrics having excellent percentage stretch ratios, although flat, tricot and other types of knits can also be used.

Coating 12 is made from a wide variety of polymeric materials used in the coating industry such as polyvinyl chloride, polyvinylidene chloride, polyisoprenes, polynitriles, polyolefins, polyethylene terephthalate, and polyurethanes. Copolymers and interpolymers of these and other synthetic materials also can be used to make the coating. Pigments, stabilizers, plasticizers, and fillers can be added to the material used to make coating 12 if desired. Polyvinyl chloride is usually used to make coating 12 because it produces a coated fabric having excellent adhesion, percentage stretch, abrasion resistance and appearance.

As shown in FIGURE 2, coating 12 adheres to essentially one side only of substrate 11. Substantial impregnation of coating 12 into the openings between the yarns of substrate 11 is not essential to adequate adhesion of the coating to the substrate of the coated fabrics of this invention, although such impregnation can be used if desired.

Coating 12 can be applied to substrate 11 in any of the usual methods such as laminating, skim or bank coating, dipping, knifing, rolling, brushing, etc. When laminating a coating to a substrate to produce a coated fabric of this invention, the coating and the substrate are first preheated by passing over and under heated drums and rolls. Coating and substrate are then brought together between a laminating roll and a rubber backup roll where lamination takes place under pressure. Excellent adhesion of the coating to the substrate results. If desired, the exposed surface of coating 12 can be embossed, printed, top coated, or otherwise treated to provide additional properties or different patterns. The coated fabric is then cooled and wound into large rolls for use in upholstering.

In the fabric of this invention shown in FIGURE 3, each course of the substrate is knitted with the same yarn 24. As shown in FIGURE 4, yarn 24 is made by twisting a synthetic fiber strand 25 with a natural fiber strand 26. A core strand of either synthetic or natural fiber can be used if desired. Yarn 24 is then knitted into a substrate and coated by any of the methods described above. The resulting coated fabric has a percentage stretch ratio above most prior art fabrics, although the average percentage stretch ratio of FIGURE 3 fabrics of this invention is not as high as the FIGURE 1 fabrics. Coated fabrics of this invention made according to FIGURE 1 generally have percentage stretch ratios above 0.40:1 and have been produced with percentage stretch ratios exceeding 0.7:1.

The percentage stretch ratio of coated fabrics of this invention is determined by cutting two test specimens 3 inches by 9 inches from the center of the fabric. One specimen is cut with the 9 inch dimension parallel to the wales of the fabric and the other is cut with the 9 inch dimension parallel to the courses of the fabric. A line is marked across each specimen 3 inches from each end. One end of a specimen is then clamped along the entire 3 inch dimension to a fixture, and a 27 pound weight is hung from the other end for 10 minutes by a clamp distributing the weight across the entire 3 inch dimension.

The increase in length of the 3 inch center section is then measured and is used to calculate the percent of stretch. After both specimens have been tested in this manner, the percentage stretch ratio is calculated by dividing the percent of stretch of the specimen with the 9 inch dimension parallel to the wales by the percent of stretch of the specimen with the 9 inch dimension parallel to the courses.

The following examples further illustrate the preparation and the properties of coated fabrics of this invention.

EXAMPLE I

A knitted substrate is prepared by circularly knitting alternating courses of number 18 cotton yarn and 300 denier nylon yarn to produce a substrate weighing 5.1 ounces per square yard which is 50 percent by weight cotton and 50 percent by weight nylon. The knitted substrate has a yarn count of 27 wales per inch and 35 courses per inch.

A polyvinyl chloride coating is laminated to this substrate by a laminating process in which substrate and coating first pass individually over large upper drums and move downward between the drums. The substrate and the coating are adjacent to each other but are not yet in contact. Below each drum is a set of two Teflon coated rolls, one of which is above the other. The substrate and the coating are threaded individually through its respective set of rolls by passing around the upper roll, through the opening between the rolls and back around the lower roll so each upper roll contacts the surface of the substrate or coating that will eventually be laminated together and each lower roll contacts the other surface. The substrate drum is heated to about 325–345° F. and the substrate rolls are heated to about 330–360° F. Both the coating drum and the coating rolls are heated to about 310–340° F.

Substrate and coating are then brought together between a laminating roll and a rubber backup roll located below the sets of rolls. The laminating roll is also Teflon coated and it applies a pressure of about 40–100 pounds per square inch to laminate the substrate and the coating. Material speed through this arrangement is about 15 to 30 feet per minute. After lamination, the resulting coated fabric is air cooled.

This coated fabric has excellent adhesion, tensile strength and tear strength and a percentage stretch ratio of 0.72. Properties of the fabric are summarized in the following table where the fabric is designated Example I. Automotive bucket seats upholstered with this fabric without bias cutting have excellent tear resistance, adhesion, and wrinkle resistance.

EXAMPLE II

A cotton strand is twisted with a 190 denier nylon strand to form a yarn having 50 percent by weight cotton and 50 percent by weight nylon. The yarn is knitted into a substrate, and a polyvinyl chloride coating is laminated thereto by the process used in Example I to form a coated fabric of this invention weighing about 26.7 ounces per square yard. The yarn count in the substrate is approximately 29 wales per inch and 32 courses per inch.

Tensile strength and tear strength of this coated fabric exceeded the coated fabric prepared according to Example I, and the fabric had a percentage stretch ratio of 0.39. Household furnishings are easily upholstered with the Example II fabric because its percentage stretch ratio eliminates the need for bias cutting to prevent wrinkles and puckering. The upholstered articles have excellent adhesion and abrasion and tear resistance. Properties of the coated fabric of Example II also are summarized in the following table.

In the table, the tensile strength, tear strength, percent stretch, and percentage stretch ratio are presented for a variety of polyvinyl chloride coated substrates. For comparison purposes, data is presented for coated substrates made of woven cotton yarn and nylon yarn, knitted cotton, knitted cotton-nylon yarn constructed according to FIGURE 3 of the drawing and including the Example II coated fabric, and knitted cotton yarn alternating with nylon yarn constructed according to FIGURE 1 of the drawing and including the Example I coated fabric.

The woven substrate for which data is presented in the table comprises a minimum of 31 ends of #4 singles carded cotton yarns in the warp and a minimum of 39 ends of 210 denier, 34 filament high tenacity nylon in the fill direction per inch. All knitted substrates presented in the table have a circular knit construction. The 4.9 ounce knitted cotton substrate has a minimum of 27 wales and 35 courses of number 24 cotton yarn per inch and is similar to the Example I material except for the alternating courses of synthetic fiber yarn used in the latter. Coated fabrics made from the 6.8 ounce knitted cotton substrate presented in the table have been used in the past for upholstering automotive bench-type seats.

TABLE.—COATED SUBSTRATES

| Substrate material | Substrate wgt., oz./yd. | Coated substrate wgt., oz./yd. | Tensile strength, lb./inch, ASTM D-39 | | Tear strength, lb. | | Stretch, percent | | Percentage stretch ratio, wales or warp/ courses or fill |
|---|---|---|---|---|---|---|---|---|---|
| | | | wales or warp | courses or fill | wales or warp | courses or fill | wales or warp | courses or fill | |
| Woven cotton yarn and nylon yarn | 7 | | 178 | 197 | 22 | 55 | 2.1 | 10.4 | .20 |
| Knitted cotton | 6.8 | 26.6 | 125 | 118 | 27 | 22 | 12 | 44 | .27 |
| Do | 4.9 | | 109 | 115 | 24 | 24 | 12 | 34.3 | .35 |
| Knitted cotton, nylon yarn: | | | | | | | | | |
| Figure 3 fabrics | 6.7 | 21.4 | 240 | 160 | 40 | 55 | 17 | 75 | .23 |
| Do | 7.6 | 20.3 | 170 | 145 | 45 | 45 | 25 | 70 | .36 |
| Figure 3 fabrics (example II) | 6.7 | 26.7 | 193 | 139 | 48 | 64 | 22.9 | 58.3 | .39 |
| Do | 5.1 | 22 | 235 | 175 | 40 | 50 | 25 | 55 | .45 |
| Do | 8.0 | 28.5 | 272 | 230 | 53 | 58 | 19 | 41 | .46 |
| Knitted cotton, yarn alternating with nylon yarn: | | | | | | | | | |
| Figure 1 fabrics | 7.0 | 28.3 | 128 | 122 | 24 | 72 | 14 | 35 | .40 |
| Do | 6.4 | 26.5 | 110 | 135 | 20 | 75 | 20 | 40 | .50 |
| Do | 5.1 | 22.9 | 110 | 150 | 25 | 55 | 25 | 40 | .62 |
| Figure 1 fabrics (example I) | 5.1 | 23 | 152 | 112 | 23 | 53 | 27.1 | 37.5 | .72 |

Provided by this invention is a coated, knitted fabric having a better balance of percent of stretch in both surface directions and better adhesion between coating and substrate than has previously been obtained without intermediate layers of adhesives. The coated fabric also has excellent tensile strength and resistance to tearing and abrasion and is useful particularly in upholstering automotive bucket seats. Apparently the coated fabrics of this invention obtain their improved properties by the synergetic effect of the mixture of synthetic fiber yarn and natural fiber yarn in the substrate.

I claim:

1. A coated fabric consisting essentially of a flexible polymeric coating adhered directly to at least one surface of a knitted substrate, said substrate comprising synthetic fiber yarn and natural fiber yarn, said coated fabric having a ratio of percentage stretch in its wales direction to its courses direction of at least 0.36.

2. The coated fabric of claim 1 in which the substrate comprises courses of synthetic fiber yarn mixed with courses of natural fiber yarn.

3. The coated fabric of claim 2 in which the synthetic fiber yarn has a tenacity of at least 3 grams per denier.

4. The coated fabric of claim 3 in which the synthetic fiber yarn consists essentially of polyamide fiber and the natural fiber yarn consists essentially of cotton fiber.

5. The coated fabric of claim 4 in which the polymeric coating consists essentially of polyvinyl chloride.

6. The coated fabric of claim 1 in which each course of the substrate comprises a natural fiber strand and a synthetic fiber strand.

7. The coated fabric of claim 1 in which the synthetic fiber yarn has a tenacity of at least 3 grams per denier.

8. The coated fabric of claim 1 in which the synthetic fiber yarn consists essentially of polyamide fiber and the natural fiber yarn consists essentially of cotton fiber.

References Cited

UNITED STATES PATENTS

| | | | |
|---|---|---|---|
| 2,755,535 | 7/1956 | Schoenberger | 28—80 |
| 2,947,340 | 8/1960 | French | 66—702 |
| 2,706,699 | 4/1955 | Plansoen et al. | 161—89 |
| 3,072,512 | 1/1963 | Dalle | 161—88 X |

OTHER REFERENCES

Floyd: "Polyamide Resins," Reinhold Publ. Co., 1958, pp. 87 and 126.

ROBERT F. BURNETT, *Primary Examiner.*

M. A. LITMAN, *Assistant Examiner.*

U.S. Cl. X.R.

28—74; 139—383; 161—77, 91, 92